United States Patent
Solowjow et al.

(10) Patent No.: US 12,304,072 B2
(45) Date of Patent: May 20, 2025

(54) REINFORCEMENT LEARNING FOR CONTACT-RICH TASKS IN AUTOMATION SYSTEMS

(71) Applicants: Siemens Aktiengesellschaft, Munich (DE); THE REGENTS OF THE UNIVERSITY OF CALIFORNIA, Berkeley, CA (US)

(72) Inventors: Eugen Solowjow, Berkeley, CA (US); Juan L. Aparicio Ojea, Moraga, CA (US); Chengtao Wen, Redwood City, CA (US); Jianlan Luo, Berkeley, CA (US)

(73) Assignees: Siemens Aktiengesellschaft, Munich (DE); The Regents of the University of California, Berkeley, CA (US)

( * ) Notice: Subject to any disclaimer, the term of this patent is extended or adjusted under 35 U.S.C. 154(b) by 1178 days.

(21) Appl. No.: 16/970,450

(22) PCT Filed: Sep. 13, 2018

(86) PCT No.: PCT/US2018/050862
§ 371 (c)(1),
(2) Date: Aug. 17, 2020

(87) PCT Pub. No.: WO2019/168563
PCT Pub. Date: Sep. 6, 2019

(65) Prior Publication Data
US 2021/0107142 A1    Apr. 15, 2021

Related U.S. Application Data

(60) Provisional application No. 62/635,757, filed on Feb. 27, 2018, provisional application No. 62/635,771, filed on Feb. 27, 2018.

(51) Int. Cl.
*B25J 9/16* (2006.01)

(52) U.S. Cl.
CPC .............. *B25J 9/163* (2013.01); *B25J 9/1633* (2013.01); *G05B 2219/32335* (2013.01); *G05B 2219/41387* (2013.01); *G05B 2219/50391* (2013.01)

(58) Field of Classification Search
CPC .................... B25J 9/163; B25J 9/1633; G05B 2219/32335; G05B 2219/41387; G05B 2219/50391
See application file for complete search history.

(56) References Cited

U.S. PATENT DOCUMENTS

| 11,188,821 | B1* | 11/2021 | Kalakrishnan | ......... | G06N 3/063 |
| 2012/0283875 | A1* | 11/2012 | Klumpp | ................. | B25J 9/1687 |
| | | | | | 901/46 |

(Continued)

FOREIGN PATENT DOCUMENTS

| WO | 20090020600 A1 | 2/2009 |
| WO | 20160010968 A1 | 1/2016 |

OTHER PUBLICATIONS

Tadanobu, Inoue et al: "Deep reinforcement learning for high precision assembly tasks"; 2017 IEEE/RSJ International Conference on Intelligent Robots and Systems (IROS), IEEE; Sep. 24, 2017 (Sep. 24, 2017), pp. 819-825, XP033266016.

(Continued)

*Primary Examiner* — Jaime Figueroa
*Assistant Examiner* — Joshua Alexander Garza (57) ABSTRACT

Systems and methods for controlling robots including industrial robots. A method includes executing (402) a program (550) to control a robot (102) by the robot control system (120, 500). The method includes receiving (404) robot state information (554). The method includes receiving (406) force torque feedback (556) inputs from a sensor (554) on (Continued)

the robot (102). The method includes producing (410) a robot control command for the robot (102) based on the robot state information (554) and the force torque feedback (556) inputs. The method includes controlling (412) the robot (102) using the robot control command.

8 Claims, 5 Drawing Sheets

(56) References Cited

U.S. PATENT DOCUMENTS

| | | |
|---|---|---|
| 2017/0106542 A1 | 4/2017 | Wolf et al. |
| 2019/0184564 A1* | 6/2019 | Muraoka ................ B25J 9/1633 |
| 2020/0030970 A1* | 1/2020 | Mariyama .............. B25J 9/1697 |
| 2020/0129265 A1* | 4/2020 | Matsuda ................... B25J 9/12 |

OTHER PUBLICATIONS

International Search Report mailed Feb. 11, 2019; International Application No. PCT/US2018/050862; 13 pages.

\* cited by examiner

REINFORCEMENT LEARNING FOR CONTACT-RICH TASKS IN AUTOMATION SYSTEMS

CROSS-REFERENCE TO OTHER APPLICATION

This application is a national phase filing under 35 U.S.C. § 371 of International Patent Application No. PCT/US2018/050862, filed Sep. 13, 2018, which claims the benefit of priority to U.S. Provisional Patent Application 62/635,757 filed on Feb. 27, 2018 and 62/635,771 filed on Feb. 27, 2018 which are hereby incorporated by reference in their entireties.

TECHNICAL FIELD

The present disclosure is directed, in general, systems and methods for operation and control of automation system, including in particular robotic assembly systems.

BACKGROUND OF THE DISCLOSURE

Automation systems, including robotic systems such as robotic assembly systems, robotic machining systems, robotic welding systems, and others, can enable efficient automation of manufacturing and other tasks. In current systems, manual programming is inefficient and a priori designed feedback controllers are limited. Improved systems are desirable.

SUMMARY OF THE DISCLOSURE

Disclosed embodiments include systems and methods for controlling robots, including industrial robots. A method includes executing a program to control a robot by the robot control system. The method includes receiving robot state information. The method includes receiving feedback inputs from a sensor on the robot. The method includes producing a robot control command for the robot based on the robot state information and the feedback inputs. The method includes controlling the robot using the robot control command.

In some embodiments, the feedback inputs are filtered using a low-pass filter. In some embodiments, an admittance controller is used to process the robot state information and the force torque feedback inputs. In some embodiments, producing the robot control command is performed using a neural net that includes nodes corresponding to the feedback inputs. In some embodiments, producing the robot control command is performed using a mirror descent guided policy search process. In some embodiments, the sensor is a force/torque sensor mounted on a wrist of an arm of the robot. In some embodiments, the robot control system is a reinforcement learning control system.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

The Figures discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Today, industrial robots deployed across various industries are mostly doing repetitive tasks. The overall task performance hinges on the accuracy of their controllers to track pre-defined trajectories. Additionally, the ability of robots to handle unconstructed complex environments is limited in today's manufacturing environments. To this end, endowing these machines with a greater level of intelligence to autonomously acquire skills is desirable. The main challenge is to design adaptable yet robust control algorithms in the face of inherent difficulties to model all possible system behaviors and the necessity of behavior generalization.

Reinforcement Learning (RL) is a principled framework that allows agents to learn behaviors through interaction with their environment challenges. Currently, most RL algorithms for contact-rich assemblies and manipulation are implemented on inherently compliant robot arms such as the PR2® robots from Willow Garage, Inc. and the Sawyer robot from Rethink Robotics. These robot arms have either passive compliance by spring mechanism in motors or allow the control system to measure joint torques. In some cases, the RL algorithm can directly command joint torques. These properties enable safe physical interaction of the robot with its environment, and joint torque readings can be encoded as features in learning algorithms to describe contact situations. "Contact-rich" robotics refers to robotic techniques that rely on physical manipulations of objects by the robotic systems, including impacts and frictional contact.

RL methods hold promises for solving such challenges in robotic control, because they allow agents to learn behaviors through interaction with their surrounding environments and ideally generalize to new unseen scenarios. RL can be distinguished in value function-based methods and policy search. While value function-based methods in RL require learning a value function first, policy search methods are able to map robot states to actions directly.

While industrial robots typically have only position and velocity control, a force/torque sensor can be mounted on the robot "wrist." These sensors can provide haptic feedback related to contacts of the robot and its environment.

Figure 1A:
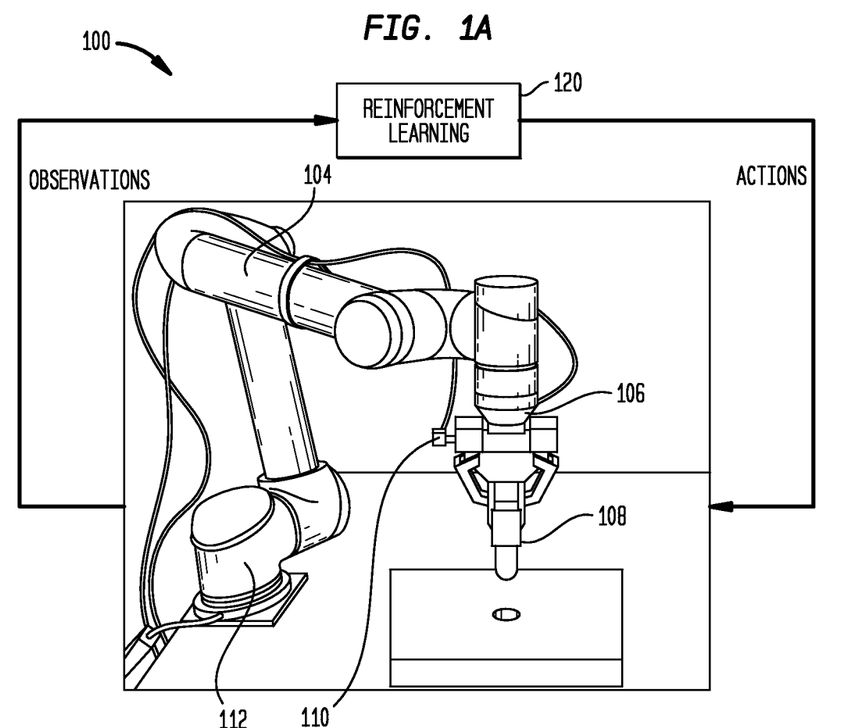
FIG. 1A illustrates an example of an RL process in accordance with disclosed embodiments.

FIG. 1A illustrates an example of an RL process 100 in accordance with disclosed embodiments. In this non-limiting example, a robot 102 with arm 104, wrist 106, and end-effector 108. Force/torque sensor 110 is mounted on wrist 106.

The RL process 100 in this example is illustrated by robot 102 producing observation/sensor data and proving it to RL control system 120. RL control system 120 analyzes the sensor data and produces actions to control robot 102.

Figure 1B:
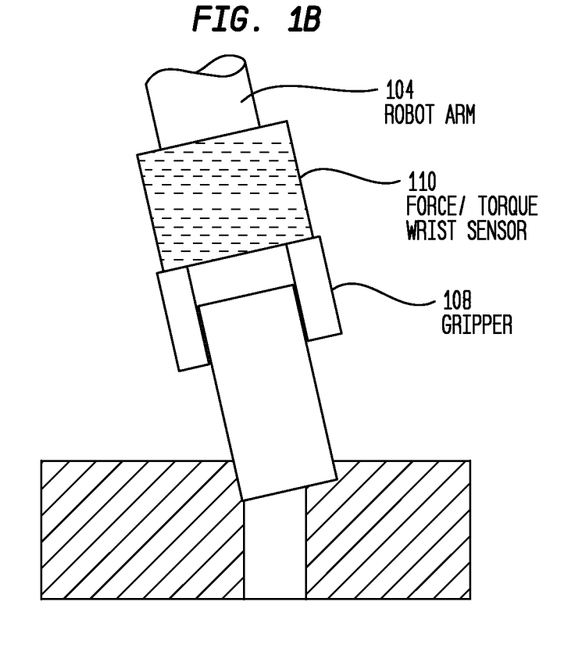
FIG. 1B illustrates another example of elements of a robot in accordance with disclosed embodiments.

FIG. 1B illustrates another example of elements of a robot 102. This example, shows robot art 104 with end-effector 108 (in this case, a gripper), and force/torque sensor 110 on the wrist of robot arm 104.

Most robot control problems are solved with approaches that are based on traditional feedback control theory. However, for increased autonomy, it is important that robot systems become capable of solving control tasks on their own. RL techniques provide the robot with a high-level specification of what to do instead of how to do it. Reinforcement learning can include model-based methods and model-free methods. A model-based policy search as described herein incorporates a model of the world dynamics that is learned from data, which requires less data to solve a task than model-free methods.

Guided policy search (GPS) processes are more sample-efficient than previous model-free reinforcement learning methods. GPS processes seek to find solutions bridging optimal control and deep reinforcement learning, and, in contrast to existing policy search algorithms, learn local models in the form of linear Gaussian controllers. When provided with roll-out data from these linear local models, a global, nonlinear policy can be learned using an arbitrary parametrization scheme. The method alternates between (local) trajectory optimization and (global) policy search in an iterative fashion.

Disclosed embodiments can employ a variant of GPS called mirror descent guided policy search (MDGPS), which is sample-efficient and uses of on-policy sampling. More broadly, disclosed embodiments are not limited to GPS or MDGPS, but can employ any form of Deep Reinforcement Learning or similar techniques, as described below.

Any contact-rich manipulation, which includes deformable nonlinear material has been very challenging for robot control so far. Traditional feedback control methods either require explicit consideration of the material response as a model or long periods of trial-and-error and fine-tuning. This can be exploited for GPS usage even if joint torques cannot be directly commanded, but only positions and velocities. Further, disclosed embodiments can extent MDGPS to directly incorporate the force-torque signals from the wrist sensor. To date, force-torque signals have not been incorporated in variants of the GPS algorithm.

Disclosed embodiments can use a model-based policy search, which incorporates a model of the world dynamics that is learned from data. Further, Deep Neural Networks techniques can be employed for parametrizing policies in policy search methods, using Deep Reinforcement Learning (DRL). Current policy search algorithms for contact-rich assemblies and manipulation do not take measurements from force/torque together with the robot state into account, even in industrial robots that are equipped with a wrist force torque sensor.

Unfortunately, this is only of limited use for industrial applications because industrial robots are in general not compliant and offer only velocity and position control. Current robotic systems cannot support torque control even if equipped with a wrist force torque sensor. This is problematic in the domain of contact-rich assembly tasks, since it can be important that robots can "feel" or "touch" during such high-precision assembly process, and positional information alone is not enough.

In some disclosed embodiments, force torque signals from a wrist force torque sensor can be used for policy search algorithms in contact-rich tasks. This is particularly useful for robots whose joint torques cannot be directly commanded, but only positions and velocities. The suggested approach will improve the "touch" feeling for robots in contact-rich tasks.

Disclosed embodiments can also combine admittance force torque control theory with RL algorithms. In some embodiments, a feedback controller is designed as or includes a filter prior to the RL algorithm. The feedback controller considers the differences between the desired torques/forces and the measured torques/forces as well as the differences of their time derivatives. The measurements are provided by a wrist force/torque sensor. The feedback control signal can be fed to the RL algorithm. At the same time, the RL algorithm provides the desired torques/forces to the feedback controller. The output signal of the overall algorithm is then fed to the velocity or/and position control loop of the robot.

Robot arms typically do not have joint torque control for RL of contact-rich manipulations and assemblies, and disclosed embodiments provide improved robotic systems by, in some cases, combining admittance control theory with RL algorithms. This approach can enable RL algorithms for assembly to execute on existing installed industrial robots, including those that are equipped with force/torque wrist sensors. By including an admittance force/torque controller into an RL algorithm, the output of the force/torque controller can feed into the RL algorithm while the output of the RL algorithm can feeds into the force/torque controller.

In other cases, particularly in the domain of contact rich assembly tasks, disclosed embodiment can allow the robots to "feel" or "touch" during high-precision assembly processes, where positional information alone is not enough. This is accomplished in some embodiments by including the force/torque signal as an input to a neural net besides the robot state. The use of this neural net architecture improves the robotic system by improving force and torque signal usage. The part of the neural net that processes the robot state does not need to be changed.

For ease of reference, some of the symbols and expressions used herein include:

$x_t$ refers to a state at time step t;
$u_t$ refers to a control action at time step t;
$o_t$ refers to observation at time step t;
$K_t$ refers to feedback gain in time varying linear Gaussian controller at time t;
$k_t$ refers to a feedforward term in time varying linear Gaussian controller at time t;
$C_t$ refers to a covariance matrix for a time varying linear Gaussian controller model at time t;
$f_{x_t}$ refers to a system matrix in time varying linear Gaussian dynamics model for state at time t;
$f_{u_t}$ refers to a system matrix in time varying linear Gaussian dynamics model for control at time t;
$f_{\tau_t}$ refers to a system matrix in a time varying linear Gaussian dynamics model for force/torque information at time t;
$f_{c_t}$ refers to an affine term in a time varying linear Gaussian dynamics model at time t;
$\tau_t = [F_x^t, F_y^t, F_z^t, M_x^t, M_y^t, M_z^t]$ refers to a vector presenting force/torque information at time step t, force x, force y, force z, torque x, torque y, torque z at time t respectively;
$F_t$ refers to a covariance matrix for time varying linear Gaussian dynamics model at time t;
$Q(x_t, u_t)$ refers to a Q function of state $x_t$, total return from now on if executing action $u_t$;
$V(x_t)$ refers to a value function of state $x_t$, optimal total return at state $x_t$;
$Q_{xut}$ refers to the derivative of the Q function respect to x and u (first x then u) at time t; and
$Q_{xu,xut}$ refers to the second derivative of the Q function respect to the (x,u) pair at time t.

Other terms and symbols are described below.

From a high-level perspective, in accordance with disclosed embodiments, guided policy search methods first learn local optimal controllers in the form of a time-varying linear-Gaussian $p(u_t|x_t)=N(K_t x_t + k_t|C_t)$, and use these controllers to generate samples for training global policy $\pi_\theta(u_t|o_t)$ which are typically parameterized by a deep neural network $\theta$; where $x_t$ and $u_t$ are states and actions at time step t respectively, $o_t$ are observations recorded during training time may or may not equal to $x_t$. These time-varying linear-Gaussian controllers are under time-varying linear-Gaussian dynamics in the form $p(x_{t+1}|x_t,u_t)=N(f_{x_t}x_t+f_{u_t}u_t+f_{c_t},F_t)$, the goal is to minimize the expectation $E_{p(\tau)}[l(\tau)]$ over trajectory $\tau$ by iteratively optimizing linear-Gaussian controllers and re-fitting linear-Gaussian dynamics; where $$\tau = \{x_1, u_1, ..., x_T, u_T\}, \ell(\tau) = \sum_{t=1}^{T} \ell(|x_t, u_t)$$

denotes the cost along a single over trajectory $$\tau, p(\tau) = p(x_1) \prod_{t=1}^{T} p(x_{t+1}|x_t, u_t) p(u_t|x_t).$$

These guided policy search methods also have a mechanism to enforce agreement between state distributions of local policy and global policy.

In contact-rich robotic assembly problems, getting a fairly accurate dynamical model of the robot itself is feasible. However, modeling physical contact dynamics can be very difficult or even intractable for several reasons. For example, such contact dynamics are typically highly-nonlinear and discontinuous, deriving an exact physical model is difficult, let alone linearization of such models. Further, while rigid contact is already challenging, the material that the robot interacts with this paper is deformable, thus making intractable physical dynamical models even more unreliable.

However, one can search for the target hole by "feeling" the surface. This can be done with some simple heuristics based on haptics feedback, for instance by probing the surface. Such heuristics do not require a precise physical model for contact dynamics. This implies that designing robust strategies by properly processing observations is more desirable in this setting than estimating perfect physical dynamics. Strategies as such may compensate deficiencies of model accuracy, state estimation errors or other components in a common optimal controller design pipeline. An end-to-end policy that directly maps raw observations to actions is a good choice to represent such robust strategies. High-capacity models such as deep neural networks can be used for these end-to-end policies.

Disclosed embodiments can integrate observed haptics information with the GPS framework so that its probabilistic formulation and policy training mechanism provide a convenient interface for processing additional raw sensor data. Note that the distribution for a trajectory is of the form $$p(\tau) = p(x_1) \prod_{t=1}^{T} p(x_{t+1}|x_t, u_t) p(u_t|x_t).$$

This includes an additional assumption about the initial state distribution $p(x_1)$.

In practice, this is approximated by samples $x_1^i$; hence it is important to pick the right initial states to cover areas of interest. A process as disclosed herein can include collecting roll-outs by running a local linear-Gaussian controller and deterministic resetting to the same initial state at each iteration. The fitted linear-Gaussian dynamics in the form of $p(x_{t+1}|x_t,u_t)=N(f_{x_t}+f_{u_t}u_t+f_{c_t},F_t)$ do not necessarily reflect the dynamics governed by physics. The model can be a distribution highly over-fitting to a single motion trajectory that the robot iteratively samples from. In other words, if two such dynamical models $p_1(u_t|x_t)$ and $p_2(u_t|x_t)$ of a robot are obtained by iteratively sampling from two initial states $x_1^{(1)}, x_2^{(2)}$, they can be vastly different and non-interchangeable, although they intend to describe the dynamical behavior for the same robot.

However, if enough of such dynamical models are obtained starting from initial states covering the final task's area of interest, resulting guiding distributions can generate "good enough" data for deep neural networks to yield successful policies in terms of achieving desired goals. Haptic information such as Cartesian-space force/torque readings are generally regarded as external disturbances to the robot system, and not part of the system state space. Also, there is no necessary correlation of such readings between time steps assumed. However, the information occurred during contact interaction can be highly informative; this property can be leveraged by properly arranging force/torque measurements in the linear-Gaussian dynamics and forcing the neural network to infer underlying patterns from them. Specifically, $p(x_{t+1}|x_t,u_t)=N(f_{x_t}x_t+f_{u_t}u_t+f_{u_t}u_t+f_{\tau_t}\tau_t+f_{c_t}F_t)$ where $\tau_t=[F_x^t,F_y^t,F_z^t,M_x^t,M_y^t,|M_z^t]$ denotes Cartesian-space force/torque sensor reading at time step t. This can be applied to other DRL techniques or similar processes.

Figure 2A:
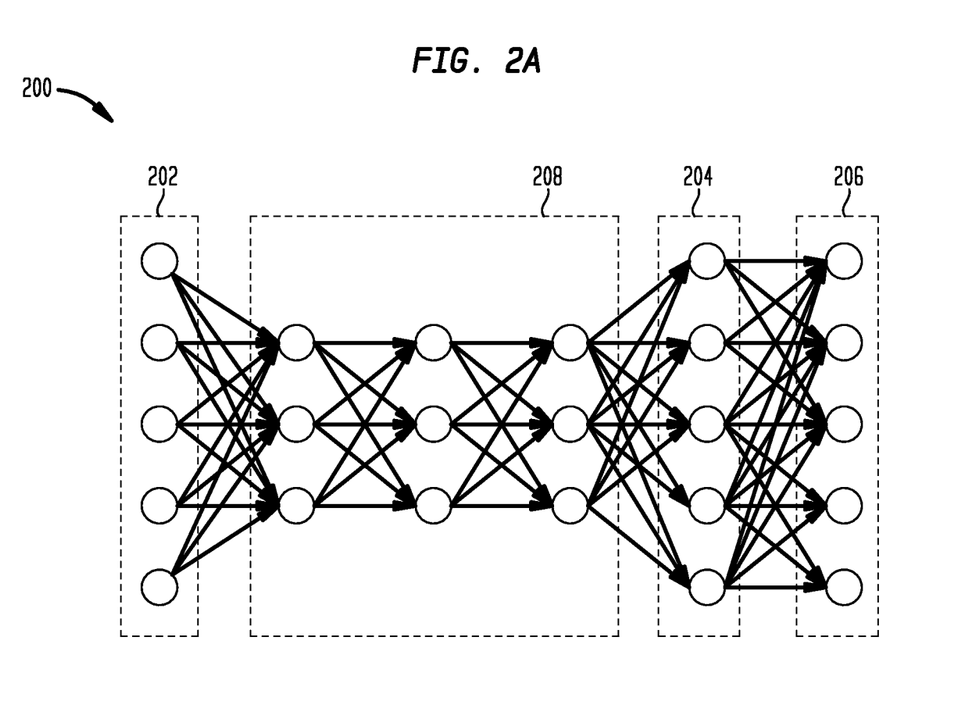
FIG. 2A illustrates an example of a neural net in accordance with disclosed embodiments.

FIG. 2A illustrates an example of a neural net 200 in accordance with disclosed embodiments, where the force/torque measurements are added to the second last layer of the neural net. In this figure, neural net 200 has entry nodes at the robot state nodes 202 and exit nodes at robot action nodes 206. Note that the number of intermediate nodes and node layers 208 is shown as three layers, but this example is arbitrary and can have different numbers of intermediate nodes/layers in different implementations. In accordance with disclosed embodiments, the next-to-last layer (that is, the neural net layer just before the robot action nodes 206) is comprised of force/torque information nodes 204. The system can traverse the last stage of the neural net according to the force/torque information nodes 204 and the actual force/torque information received from robotic sensors.

Figure 2B:
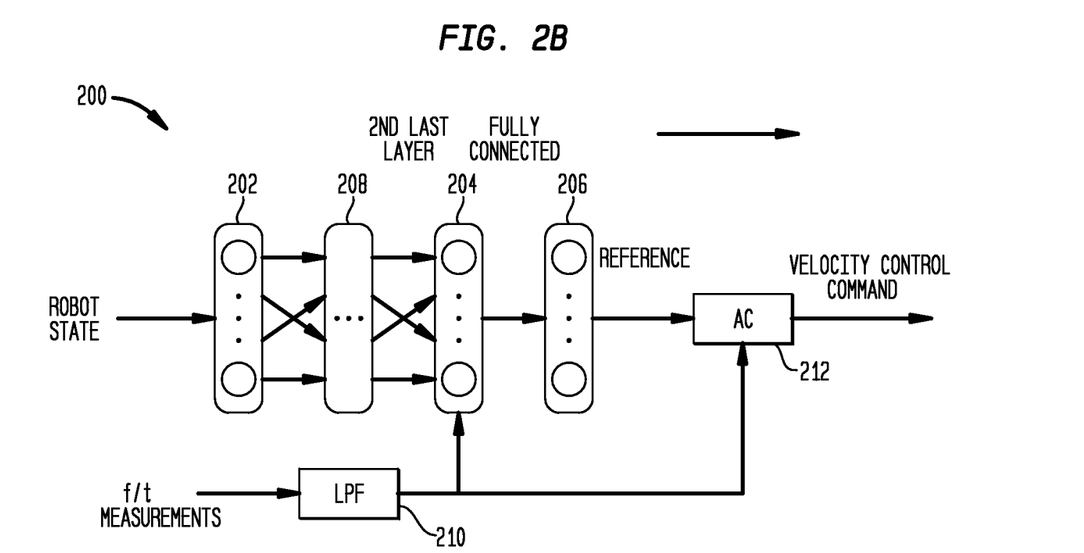
FIG. 2B illustrates an example of a neural net in accordance with disclosed embodiments.

FIG. 2B illustrates an example of a neural net 200 in accordance with disclosed embodiments, where the force/torque measurements are added to the second last layer of the neural net at force/torque information nodes 204. In this figure, neural net 200 has entry nodes at the robot state nodes 202 and exit nodes at robot action nodes 206. In accordance with disclosed embodiments, the next-to-last layer (that is, the neural net layer just before the robot action nodes 206) is comprised of force/torque information nodes 204. The system can traverse the last stage of the neural net according to the force/torque information nodes 204 and the actual force/torque information received from robotic sensors, which, in this embodiment, are first passed through low-pass filter 210. The use of low-pass filter 210 enables the system to better process noisy force/torque readings from wrist sensors.

The force/torque information is low-pass filtered and is concatenated to the second last network layer. This is for not confusing the robot to establish correspondence between external force/torque and its own movement. In this embodiment, the neural net outputs robot action from nodes 206 as a reference signal to an admittance controller (AC) 212 that computes the velocity control commands.

This neural net technique improves the "touch" and "feel" sense of the robotic system and robot arms during model-based policy search in contact-rich manipulations and assemblies. Disclosed processes and systems improve the performance of model-based policy search processes by incorporating additional information. The neural net architecture as illustrated in FIG. 1 now contains an additional input for force-torque measurements that are fed to the second last layer of any existing network.

Disclosed embodiments can use a Mirror Descent Guided Policy Search (MDGPS). Adopting the notations so far, denote $\pi_\theta(u_t|o_t)$ as the global policy, parameterized by $\theta$ over actions $u_t$, and conditioned on the observations $o_t$ recorded during training time, $p_i(u_t|x_t)$ is the i-th linear-Gaussian local policy. The system can minimize the expected cost under $\pi_\theta$ evaluated on the current trajectory, i.e., $$J(\theta) = \sum_{t=1}^{N} E_{\pi_\theta(x_t,u_t)}[\ell(x_t, u_t)]$$

where $l(x_t,u_t)$ is the cost function. Thus, the overall optimization problem reads $$\min_{\theta,p_1,\ldots,p_N} \sum_{i=1}^{N}\sum_{t=1}^{T} E_{p_1(x_t,u_t)}[\ell(x_t, u_t)]$$

$$s.t. \quad p_i(u_t|x_t) = \pi_\theta(u_t|x_t) \; \forall \; x_t, u_t, t, i.$$

Instead of performing optimization on the parameter space by directly computing the gradient of $J(\theta)$, MDGPS is an on-policy sampling algorithm alternating between solving a constrained optimization problem with respect to local policies and training a global policy on samples generated from local policies by supervised learning with a surrogate loss function minimizing the KL-divergence between them. Disclosed embodiments improve local policies within some trust region on the constraint manifold in policy space, then use supervised learning to project these locally-improved policies back onto the constrained manifold in the parameter space. Disclosed embodiments can then choose a simple representation of global policy by mixing several state trajectory distributions, where convenient trajectory-centric optimization methods can be applied, e.g. iterative Linear Quadratic Gaussian (iLQG) control.

Figure 3:
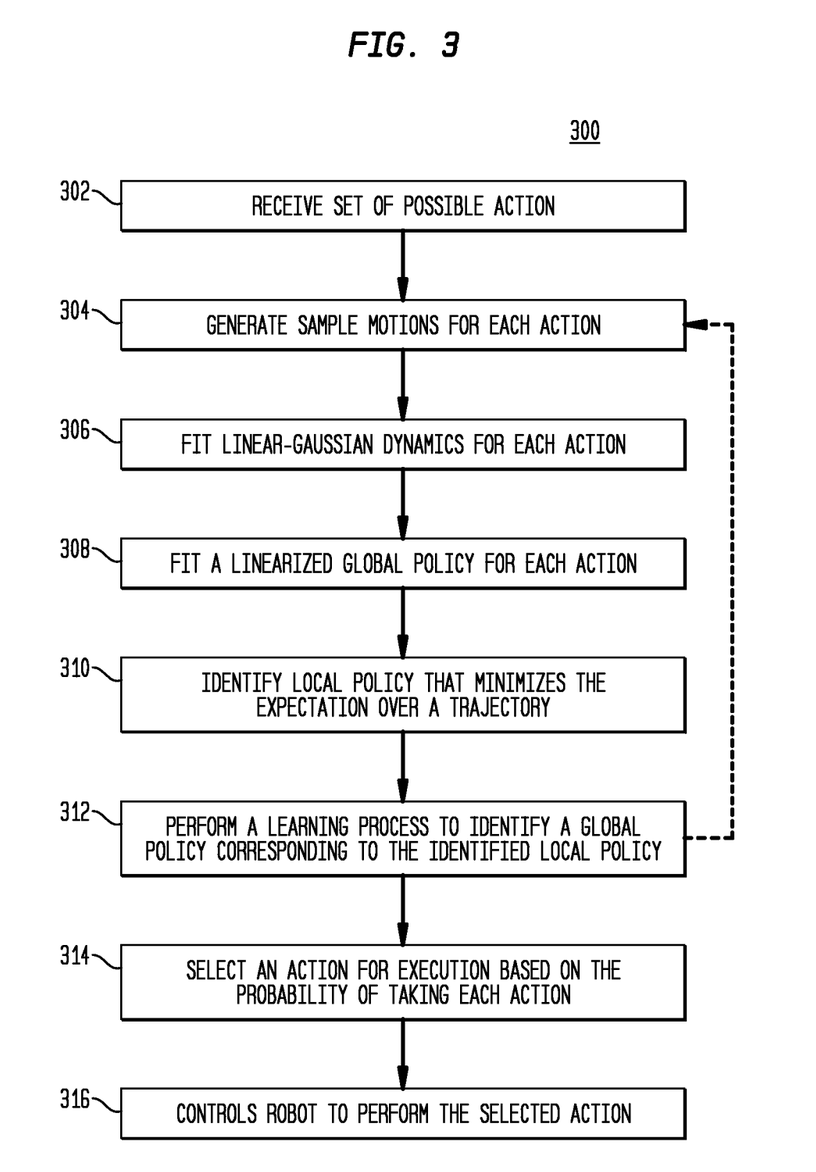
FIG. 3 illustrates a process for using a mirror descent guided policy search in accordance with disclosed embodiments.

FIG. 3 illustrates a process for using MDGPS in accordance with disclosed embodiments. In this process, $p_i$ represents the ith local policy, and $o_t$ is the observation at time step t. Note that the process of FIG. 3 includes KL-divergence constraints, which are calculated by linearizing the global policy $\pi_\theta$, and serve to minimize the difference between the global and local policies. In this implementation, the system can use the same method to linearize the global policy, which was also used to fit the dynamics. That is, the system can query the neural network policy to take an action, record the $\{x_t,u_t,x_{t+1}\}$ tuples, and perform linear regression on them using Gaussian Mixture Models as priors.

The system receives a set of possible actions (302). "Receiving" as used herein, can include loading from storage, receiving from another device or process, receiving via an interaction with a user, or otherwise. Each action k is in the set of actions as $k \in \{1, \ldots, K\}$.

The system generates sample motions for each action (304). This can include generating samples $D_i=\{\tau_{i,j}\}$ by determining a local policy $p_i$ for each action or a global policy $\pi_{\theta i}$ for each action as described herein.

The system fits linear-Gaussian dynamics for each action (306). This can include fitting $p_i(u_t|x_t)$ using the samples in $D_i$.

The system fits a linearized global policy for each action (308). This can include fitting $\bar{\pi}_\theta(u_t|o_t)$ using the samples in $D_i$.

The system identifies the local policy that minimizes the expectation over a trajectory (310). This can include identifying $p_i \leftarrow \arg\min_{p_i(\tau)}[\Sigma_{t=1}^T l(x_t,u_t)]$ such that $D_{KL}(p_i(\tau)\|\bar{\pi}_{\theta i}(\tau)) \leq \epsilon$.

The system performs a learning process to identify a global policy corresponding to the identified local policy (312). This can include identifying $\pi_\Theta \leftarrow \arg\min_{\pi_\theta} \Sigma_{t,i,j} D_{KL}(\pi_\Theta(u_t|x_{t,i,j}) \| p_i(u_t|x_{t,i,j}))$.

The system adjusts the probability s of taking each action, based on the identified global policy, as described herein (312). This process repeats to 304 for each remaining action in the set of actions.

The system selects an action for execution based on the probability of taking each action (314).

The system controls a robot to perform the selected action (316).

During the local trajectory optimization phase, the algorithm iteratively linearizes the dynamics around the current nominal trajectory, constructs a quadratic approximation to the cost, computes the optimal actions with respect to this approximation of the dynamics and cost, and forward runs resulting actions to obtain a new nominal trajectory. Subscripts, e. g., $\ell_{xu,t}$, are used to denote derivatives with respect to vector $[x_t; u_t]$. Under the dynamics model and the cost function described in this section, the Q-function and value function can be expressed as $$V(x_t) = \tfrac{1}{2} x_t^T V_{x,xt} x_t + x_t^T V_{xt} + \text{const}$$

$$Q(x_t, u_t) = \tfrac{1}{2} [x_t; u_t]^T Q_{xu,xut} [x_t; u_t] + [x_t; u_t]^T Q_{xut} + \text{const}$$

V and Q can be solved for with a recurrence that can be computed backwards through time starting from the last time step t=T:

$$Q_{xu,xut} = \ell_{xu,xut} + f_{xut}^T V_{x,xt+1} f_{xut}$$

$$Q_{xu,xut} = \ell + f_{xut}^T V_{xt+1}$$

$$V_{x,xt} = Q_{x,xt} - Q_{u,xt}^T Q_{u,ut}^{-1} Q_{u,xt}$$

$$V_{x,xt} = Q_{xt} - Q_{u,xt}^T Q_{u,ut}^{-1} Q_{ut} \qquad (1)$$

This results in the optimal control law $g(x_t) = K_t x_t + k_t$, with $K_t = -Q_{u,ut}^{-1} Q_{u,xt}$ and $k_t = Q_{u,ut}^{-1} Q_{u,ut}$. The MaxEntropy LQR objective can be optimized using the time-varying linear-Gaussian controller $p(u_t, x_t)$:

$$\min_{p(u_t|x_t)} \sum_{t=1}^{T} E_{p(u_t,x_t)}[\ell(x_t | u_t) - H(p(u_t | x_t))]$$

The last term in the objective function is an entropy term encouraging exploration. This objective can be optimized by setting $p(u_t|x_t) = N(K_t x_t + k_t, C_t)$ and $C_t = Q_{u,u_t}^{-1}$. The intuition behind this is: $Q_{u,u_t}$ reflects how the controller's action at time step t, $u_t$ will affect the cost to go $Q(x_t, u_t)$; if $Q_{u,u_t}$ is large, the action will largely affect future result, so the system should reduce exploration; if $Q(x_t, u_t)$ is small, then the system can do more exploration, so set $C_t = Q_{u,u_t}^{-1}$ properly reflects this.

The system can integrate cartesian-space force/torque information. Force/torque information is important for contact-rich assembly tasks. It allows robots to feel the surface that is going to be operated on and the reactions from the parts. However, it is difficult to incorporate such information into the dynamic system for several reasons. For example, force/torque information cannot be simply concatenated into robot state space. To illustrate, denote the force/torque vector on robot wrist at time step t as $\tau_t = [F_x^t, F_y^t, F_z^t, M_x^t, M_y^t, M_z^t]$, the vector $\tau_{t+1}$ can have a relatively weak correlation with $\tau_t$. Two subsequent force/torque vectors are regarded as measurements of external interactions. As another example, force/torque sensor signals can be very noisy and therefore it can be difficult to extract useful information.

To incorporate force/torque information into the policy learning process, $\tau_t$ can be concatenated into the robot state space, $\hat{x}_t = [x_t; \tau_t]$, and everything else in the process illustrated in FIG. 3 remains unchanged, providing both a sanity check and baseline policy learning. Second, the formulation $p(x_{t+1}|x_t, u_t) = N(f_{x_t} x_t + f_{u_t} u_t + f_{\tau_t} \tau_t + f_{c_t}, F_t)$ can be used as the local policy and provide force/torque information to the global policy neural network. This can be used in the overall control structure as illustrated in FIG. 2B discussed above. Note that the neural network can feed into an admittance controller (AC), which also incorporates the force/torque signals. The AC can be used to process robot state information and the force torque feedback inputs as described herein. The AC can be used to make the robot compliant to aid in controller learning that includes noncompliant feedback inputs.

Disclosed embodiment can perform a policy search on non-compliant robots equipped with a force/torque wrist sensor. Most industrial robots only provide interfaces for position and velocity control, and do not have low-level torque interfaces. Non-compliant position-controlled industrial robots can be dangerous in learning regimes, they will stick to pre-calculated trajectories thus yielding unexpected large force or moments when facing contact. Disclosed embodiments address this issue by feeding Cartesian-space force/torque sensor signals to the robot's Cartesian-space velocity control loop. Specifically, denote r as the desired force/torque vector in tool space, this includes three forces and three torques in three corresponding Cartesian axes. $\hat{\tau}$ denotes the measured force/torque vector from the robot's wrist sensor.

In disclosed embodiments, the system applies a Proportional Derivative feedback controller to the difference between $\tau$ and $\hat{\tau}$, and feeds the resulting control to the Cartesian-space velocity command interface of the robot. This can include calculating the inverse Jacobian matrix of the robot and converting Cartesian-space velocity into joint-space velocity. The resulting admittance controller is combined with the RL processes, as illustrated in FIG. 2B.

Disclosed embodiments can incorporate force/torque information in local policy learning process by adding an additional term to the time-varying linear-Gaussian dynamics in the form of $p(x_{t+1}|x_t, u_t) = N(f_{x_t} x_t + f_{u_t} u_t + f_{\tau_t} \tau_t + f_{c_t}, F_t)$. Adding direct measurements of contact loads $\tau_t$ can provide better estimates of the state $x_{t+1}$ when properly processed. The linear dynamical models are sufficient to capture probabilistic transition relations, and policy neural networks might generalize from these distributions.

The dynamics in an equivalent form:

$$x_{t+1} = f_{x_t} x_t + f_{u_t} u_t + f_{\tau_t} \tau_t + f_{c_t} + \sigma, \sigma \in N(0, F_t)$$

In order to re-use the convenient recurrence in equation (1) above, the dynamic can be rearranged as follows:

$$\underbrace{\begin{bmatrix} x_{t+1} \\ \tau_{t+1} \end{bmatrix}}_{x'_{t+1}} = \underbrace{\begin{bmatrix} f_{x_t} & f_{\tau_t} \\ 0 & 0 \end{bmatrix}}_{f'_{x_t}} \underbrace{\begin{bmatrix} x_t \\ \tau_t \end{bmatrix}}_{x'_t} + f_{u_t} u_t + f_{c_t} + \sigma$$

This is in the form of $$x'_{t+1} = f'_{x_t} x'_t + f_{u_t} u_t + f_{c_t} + \sigma$$

or $p(x'_{t+1}|x'_t, u_t) = N(f'_{x_t} x'_t + f_{u_t} u_t + f_{c_t}, F_t)$ \qquad (2)

Equation (2) has the exact form of time-varying linear-Gaussian dynamics used in recurrence of equation (1). In practical implementations, $x_t$ can be replaced with $x'_t$, and $f_{x_t}$ with $f'_{x_t}$, everything else can be a Linear Quadratic Regulator backward pass and forward pass reflected in equation (1).

Note that this rearrangement is not the same as augmenting the robot state space that discussed above, but is for convenience to calculate the optimal control laws. In the case of augmenting the state space, the new "$f'_{x_t}$" matrix can be entirely fitted using samples, forcing $\tau_t$ to relate with every term before time step t in the system, which is preferably avoided as $\tau_t$ in general is not Markovian. The equation can be expressed in an equivalent form for conveniently solving trajectory optimization already implemented in the GPS code base. Note that there are two zero blocks in the matrix $f'_{x_t}$, which will cause $\tau_{t+1}=0$ for all time steps, so in various implementations, the actual sensor readings for $\tau_t$. These processes can be used in the context of the process illustrated in FIG. 3.

Figure 4:
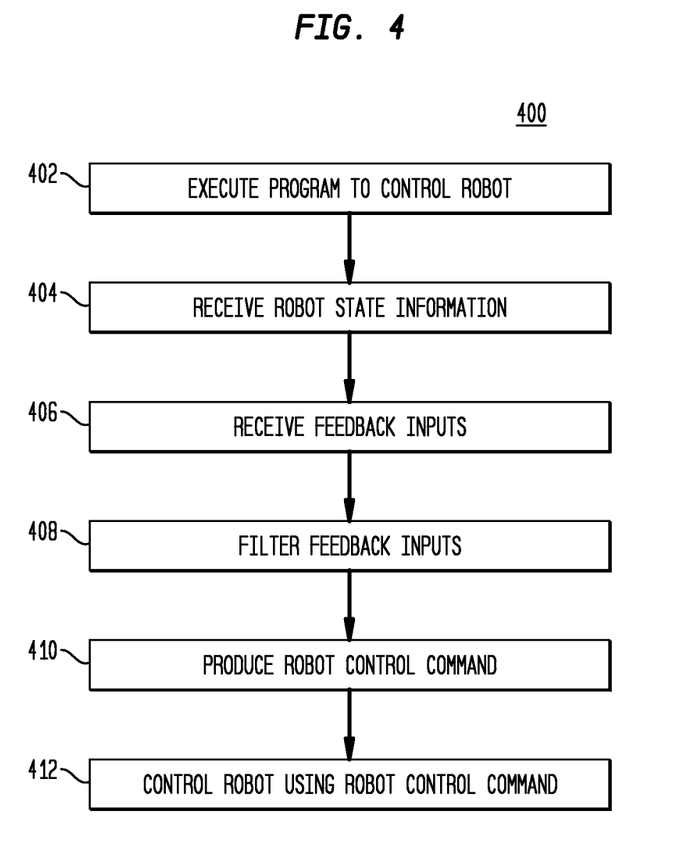
FIG. 4 illustrates a process in accordance with disclosed embodiments.

FIG. 4 illustrates a process in accordance with disclosed embodiments, as can be performed by a robot control system, such as RL control system 100 or the other elements described herein.

The system executes a program to control a robot (402).

The system receives robot state information (404).

The system receives force-torque feedback inputs from a sensor on the robot (406). The sensor can be a force/torque sensor. The sensor can be mounted on a wrist of a robot arm of the robot. The feedback inputs can be force/torque measurements.

The system can filter the force-torque feedback inputs (408). This can be performed by passing the feedback inputs through a low-pass filter.

The system produces a robot control command for the robot based on the robot state information and the force-torque feedback inputs (410). This can be a velocity control command. This can be performed using a neural net that includes nodes corresponding to the feedback inputs as described above. This can be performed using an admittance controller as described herein. This can be performed using any of the processes described herein. This can be performed using a mirror descent guided policy search process as described herein.

The system controls the robot using the robot control command (412).

Figure 5:
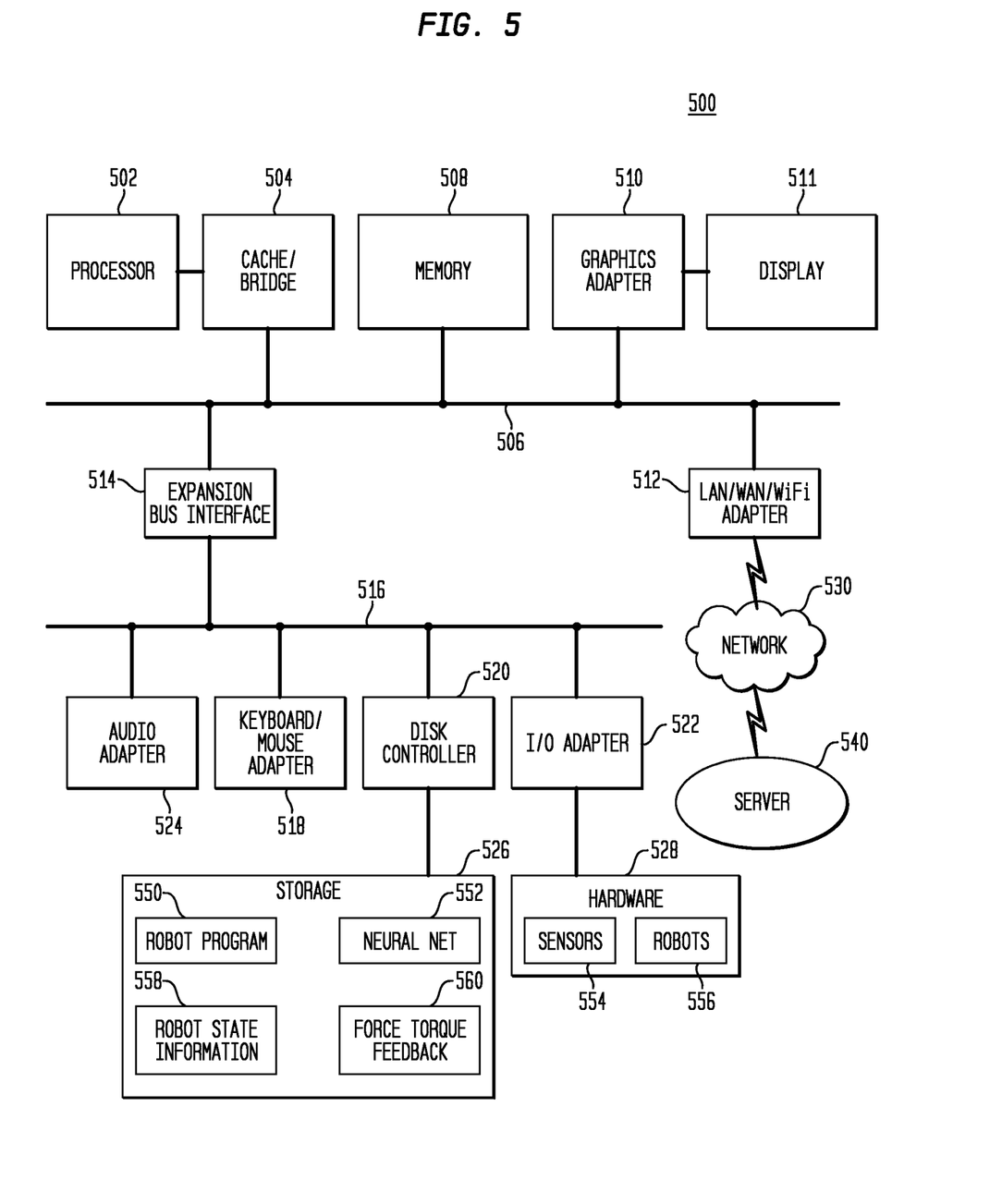
FIG. 5 illustrates a block diagram of a data processing system in which an embodiment can be implemented.

FIG. 5 illustrates a block diagram of a data processing system in which an embodiment can be implemented, for example as a robot control system or other system to control robotic processes as described herein, particularly configured by software or otherwise to perform the processes as described herein, and in particular as each one of a plurality of interconnected and communicating systems as described herein. The data processing system depicted includes a processor 502 connected to a level two cache/bridge 504, which is connected in turn to a local system bus 506. Local system bus 506 may be, for example, a peripheral component interconnect (PCI) architecture bus. Also connected to local system bus in the depicted example are a main memory 508 and a graphics adapter 510. The graphics adapter 510 may be connected to display 511.

Other peripherals, such as local area network (LAN)/Wide Area Network/Wireless (e.g. WiFi) adapter 512, may also be connected to local system bus 506. Expansion bus interface 514 connects local system bus 506 to input/output (I/O) bus 516. I/O bus 516 is connected to keyboard/mouse adapter 518, disk controller 520, and I/O adapter 522. Disk controller 520 can be connected to a storage 526, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices. Storage 526 can store, in particular, a robot program 550, a neural net 552, robot state information 558, force torque feedback 560, or other data, programs, or instructions as described herein.

Also connected to I/O bus 516 in the example shown is audio adapter 524, to which speakers (not shown) may be connected for playing sounds. Keyboard/mouse adapter 518 provides a connection for a pointing device (not shown), such as a mouse, trackball, trackpointer, touchscreen, etc. I/O adapter 522 can be connected to communicate with or control hardware 528, which can include any hardware or physical components needed to perform processes described herein, and can include in particular, sensors 554 and robots 556.

Those of ordinary skill in the art will appreciate that the hardware depicted in FIG. 5 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 512 can be connected to a network 530 (not a part of data processing system 500), which can be any public or private data processing system network or combination of networks, as known to those of skill in the art, including the Internet. Data processing system 500 can communicate over network 530 with server system 540, which is also not part of data processing system 500, but can be implemented, for example, as a separate data processing system 500.

Of course, those of skill in the art will recognize that, unless specifically indicated or required by the sequence of operations, certain steps in the processes described above may be omitted, performed concurrently or sequentially, or performed in a different order.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 500 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke 35 USC § 112(f) unless the exact words "means for" are followed by a participle. The use of terms such as (but not limited to) "mechanism," "module," "device," "unit," "component," "element," "member," "apparatus," "machine," "system," "processor," or "controller," within a claim is understood and intended to refer to structures known to those skilled in the relevant art, as further modified or enhanced by the features of the claims themselves, and is not intended to invoke 35 U.S.C. § 112(f).

What is claimed is:

1. A process performed by a robot control system, comprising:
    executing a program to control a robot by the robot control system;
    receiving robot state information by the robot control system;
    receiving force torque feedback inputs from a sensor on the robot by the robot control system;
    producing a robot control command for the robot using a guided policy search process, by the robot control system, based on the robot state information and the force torque feedback inputs and on a reference signal of a neural network, wherein the reference signal is based on the robot state information and the force torque feedback inputs, the force torque feedback inputs being added to a next-to-last layer of the neural network at force torque information nodes; and
    controlling the robot using the robot control command, by the robot control system.

2. The process of claim 1, further comprising filtering the force-torque feedback inputs using a low-pass filter.

3. The process of claim 1, wherein an admittance controller is used to process the robot state information and the force torque feedback inputs.

4. The process of claim 1, wherein producing the robot control command is performed using a mirror descent guided policy search process.

5. The process of claim 1, wherein the sensor is a force/torque sensor mounted on a wrist of an arm of the robot.

6. The process of claim 1, wherein the robot control system is a reinforcement learning control system.

7. A robot control system comprising:
    a memory; and
    a processor in communication with the memory, wherein processor is configured to perform a process as in claim 1.

8. A non-transitory computer-readable medium storing executable instructions that, when executed, cause robot control system to perform a process as claim 1.

* * * * *